US010189552B2

(12) United States Patent
Shiraishi et al.

(10) Patent No.: US 10,189,552 B2
(45) Date of Patent: Jan. 29, 2019

(54) SHIP PROPULSION METHOD AND SHIP PROPULSION DEVICE

(71) Applicant: NIIGATA POWER SYSTEMS CO., LTD., Tokyo (JP)

(72) Inventors: Koichi Shiraishi, Ota (JP); Takuro Hatamoto, Ota (JP); Masanori Kodera, Tokyo (JP)

(73) Assignee: NIIGATA POWER SYSTEMS CO., LTD. (JP)

( * ) Notice: Subject to any disclaimer, the term of this patent is extended or adjusted under 35 U.S.C. 154(b) by 0 days.

(21) Appl. No.: 15/123,704

(22) PCT Filed: Sep. 29, 2015

(86) PCT No.: PCT/JP2015/077498
§ 371 (c)(1),
(2) Date: Sep. 6, 2016

(87) PCT Pub. No.: WO2017/056186
PCT Pub. Date: Apr. 6, 2017

(65) Prior Publication Data
US 2017/0259897 A1    Sep. 14, 2017

(51) Int. Cl.
*B63H 21/17* (2006.01)
*B63H 23/18* (2006.01)
(Continued)

(52) U.S. Cl.
CPC .............. *B63H 21/17* (2013.01); *B63H 23/18* (2013.01); *B63H 23/30* (2013.01); *H02J 7/14* (2013.01);
(Continued)

(58) Field of Classification Search
CPC ........ B63H 20/00; B63H 21/00; B63H 21/17; B63H 21/21; B63H 23/24; F16D 48/00;
(Continued)

(56) References Cited

U.S. PATENT DOCUMENTS 3,997,824 A * 12/1976 Beverley ................. H02P 5/685
318/144
6,431,928 B1 * 8/2002 Aarnivuo ............... B63H 5/125
114/144 RE
(Continued)

FOREIGN PATENT DOCUMENTS

CN        101357683 A  *  2/2009
CN        102574450 A      7/2012
(Continued)

OTHER PUBLICATIONS

International Search Report dated Dec. 15, 2015 in corresponding PCT International Application No. PCT/JP2015/077498.
(Continued)

*Primary Examiner* — Eduardo Colon Santana
*Assistant Examiner* — Said Bouziane
(74) *Attorney, Agent, or Firm* — Ostrolenk Faber LLP

(57) ABSTRACT

A ship propulsion device (1) is adapted to rotate a propeller (20) to propel a ship (2). In a case where the rotating speed of the propeller (20) is less than a predetermined rotating speed, a low-output sub-motor (M2) is controlled and rotationally driven by a small-capacity general-purpose inverter (24), and the rotational driving is transmitted to the propeller (20) so as to rotate the propeller. In that case, in a drive system of a main motor (M1), rotation is not transmitted to a slip clutch (23) or an input shaft (7) by cutting off an on-off clutch (8). In a case where the rotating speed of the propeller (20) becomes equal to or more than the predetermined rotating speed, a driving source is switched from the sub-motor (M2) to the main motor (M1) so as to couple the on-off clutch (8), and the rotating speed of the main motor (M1) is controlled by the slip clutch (23) and transmitted to the propeller (20) so as to rotate the propeller (20).

21 Claims, 5 Drawing Sheets

(51) Int. Cl.
*B63H 23/10* (2006.01)
*H02P 27/06* (2006.01)
*H02P 6/08* (2016.01)
*H02J 7/14* (2006.01)
*B63H 23/30* (2006.01)

(52) U.S. Cl.
CPC ............... *H02P 6/08* (2013.01); *H02P 27/06* (2013.01); *B63B 2755/00* (2013.01); *B63B 2759/00* (2013.01)

(58) Field of Classification Search
CPC ...... H02J 7/14; H02P 6/08; H02P 4/00; H02P 5/00; H02P 29/00
See application file for complete search history.

(56) References Cited

U.S. PATENT DOCUMENTS

| | | | |
|---|---|---|---|
| 8,310,794 B2* | 11/2012 | Pensar | H02J 3/06 361/18 |
| 8,556,668 B2 | 10/2013 | Kodera et al. | |
| 2008/0149407 A1* | 6/2008 | Shibata | B60K 6/40 180/65.27 |
| 2008/0318730 A1* | 12/2008 | Endo | B60K 6/365 477/52 |
| 2010/0147610 A1* | 6/2010 | Katsuta | B60K 6/365 180/65.265 |
| 2011/0029177 A1 | 2/2011 | Yeung et al. | |
| 2012/0019172 A1* | 1/2012 | Zing | B60L 15/2045 318/8 |
| 2012/0083173 A1* | 4/2012 | McMillan | B63H 21/20 440/6 |
| 2012/0129411 A1* | 5/2012 | Kodera | B63H 21/21 440/3 |
| 2015/0018170 A1* | 1/2015 | Hofer | B63H 21/20 477/5 |

FOREIGN PATENT DOCUMENTS

| | | |
|---|---|---|
| CN | 203543703 U | 4/2014 |
| CN | 203996856 U | 12/2014 |
| JP | 2007-284018 | 11/2007 |
| JP | 5107987 | 12/2012 |
| JP | 2014-080175 | 5/2014 |
| JP | 2015-003658 | 1/2015 |
| JP | 2015-514615 | 5/2015 |
| JP | 2015-143097 | 8/2015 |
| TW | 201343478 A | 11/2013 |
| WO | WO 2011/021727 A1 | 2/2011 |

OTHER PUBLICATIONS

Written Opinion dated Dec. 15, 2015 in corresponding PCT International Application No. PCT/JP2015/077498.

* cited by examiner

SHIP PROPULSION METHOD AND SHIP PROPULSION DEVICE

CROSS-REFERENCE TO RELATED APPLICATIONS

The present application is a 35 U.S.C. §§ 371 national phase conversion of PCT/JP2015/077498, filed Sep. 29, 2015, the content of which is incorporated herein by reference. The PCT International Application was published in the Japanese language.

TECHNICAL FIELD

The present invention relates to a ship propulsion method and a ship propulsion device using a plurality of motors.

BACKGROUND ART

In the related art, as ship propulsion devices used for work barges for towing or the like, for example those described in Patent Documents 1 to 4 are suggested.

Patent Document 1 discloses a hybrid drive device for a ship having a first drive motor and a second drive motor disposed inside a ship. The first drive motor is embodied in the form of an internal combustion engine, and the second drive motor is of an electric type.

Additionally, a ship propulsion device described in Patent Document 2 is an electric propulsion device for a ship that uses neither an inverter nor a variable-pitch propeller, and includes a diesel engine, an engine control panel that controls the rotating speed of the engine, a power generator, a motor, a speed reducer, a fixed-pitch propeller fixed to a output shaft of the speed reducer. The speed reducer allows the rotating speed to be switched to the rotating speed of either a first reduction gear or a second reduction gear.

Ship propulsion devices described in Patent Document 3 and Patent Document 4 are ship propulsion devices, such as an azimuth thruster. These Patent Documents 3 and 4 suggest ship propulsion devices in which propulsion using a single motor generator, propulsion using a single main engine, and hybrid propulsion in which assist using a motor generator is added to the output of a main engine are allowed by coupling a motor generator other than an internal combustion engine that is a main engine.

CITATION LIST

Patent Document

[Patent Document 1] Published Japanese Translation No. 2015-514615 of the PCT International Publication
[Patent Document 2] Japanese Unexamined Patent Application, First Publication No. 2014-80175
[Patent Document 3] Japanese Patent No. 5107987
[Patent Document 4] Specification of International Publication No. WO2011/021727

SUMMARY OF INVENTION

Technical Problem

In the above-described related-art hybrid ship propulsion device, electric propulsion using motor driving is performed as a known technique of a type in which a propeller is driven. In the electric propulsion using the motor driving, in a case where the fixed-pitch propeller is driven, in order to change the rotating speed of the propeller, it is necessary to variably control the speed of the motor, and inverter control is required.

However, this type of inverter has a large output such that the propeller can be driven, and requires a panel for harmonic suppression for the stability of an inboard power source. Since such an inverter is not widely available in the market, the inverter is not handled as a general-purpose article. Also, since such an inverter is a custom-made item, it is extremely expensive, and requires an installation space for the panel for harmonic suppression. This is a reason for low demand for electric propulsion devices, in contrast with ship propulsion devices in which a propeller and an internal combustion engine are directly connected together by a shaft.

Since an inverterless technique in which a special inverter is not used, a propulsion device described in Patent Document 2 is suggested. In this device, an adjustable-speed gear is provided between a propeller and a motor, and the engine rotating speed of a power generator is made variable in order to change supply frequency to the motor. In the case of this system, since the propeller driving power is interrupted at the moment when the adjustable-speed gear is changed, there are disadvantages in that shock is generated and riding comfort is poor. This is a so-called gear change state in a case where a car has a manual transmission.

The invention has been made in view of the above-described circumstances, and an object thereof is to provide a ship propulsion method and a ship propulsion device that require small occupation space and cost low, though an inverter is used, and are adapted to be able to achieve efficient drive control and fuel consumption according to propeller output.

Solution to Problem

The ship propulsion method according to the invention is a ship propulsion method for rotating a propeller to propel a ship. The ship propulsion method includes a process of controlling a rotating speed of a sub-motor using an inverter to transmit the rotating speed to the propeller in a case where a rotating speed of the propeller is less than a predetermined rotating speed; and a process of controlling a rotating speed of a main motor using a slip clutch to transmit the rotating speed to the propeller in a case where the rotating speed of the propeller is equal to or more than the predetermined rotating speed.

According to the invention, in a case where the propeller output is less than the predetermined rotating speed, the small-capacity sub-motor is rotationally driven by inverter control to rotate the propeller, and if the propeller output becomes equal to or more than the predetermined rotating speed, the driving source is switched from the sub-motor to the main motor, and the degree of slip is controlled by the slip clutch without using the inverter for the rotational driving of the main motor so as to gradually increase the propeller rotating speed. Accordingly, since shift from the sub-motor to the main motor is made without the driving power of the propeller rotation being interrupted, control of stable propeller output and navigation can be performed. Moreover, since the inverter also controls the rotation of the small-capacity sub-motor without using an internal combustion engine as the driving source, downsizing and space can be secured.

Here, the slip clutch in the invention has a function to be able to arbitrarily drop the rotating speed in a predetermined range so as to perform power transmission via a frictional force or a fluid to a device that transmits rotative power. Therefore, for example, a friction clutch, a hydraulic clutch, or a torque converter clutch is also included in the slip clutch.

Additionally, it is preferable that the slip clutch is held in a cutoff state in a case where the rotation of the sub-motor is controlled by the inverter and is transmitted to the propeller.

In the case of low output in which the propeller rotating speed is small, the slip clutch installed on the downstream side of the main motor is cut off, whereby the loss of rotational driving of the sub-motor decreases and driving efficiency is improved.

Additionally, an on-off clutch provided on a downstream side of the slip clutch with respect to the main motor may be brought into a cutoff state in a case where the rotation of the sub-motor is controlled by the inverter and is transmitted to the propeller.

By bringing the on-off clutch into the cutoff state when driving the sub-motor, the slip clutch, a shaft such as an input shaft, or the like, which is provided in a drive system of the main motor installed on the upstream side of the on-off clutch is not rotated. Therefore, the driving loss of the sub-motor is reduced and the driving efficiency is improved, and the fuel consumption can be reduced.

In addition, the on-off clutch in the invention is a clutch that does not aim at deceleration operation in slip operation, and is operated by either a connected state (on state) where rotation is transmitted, and a cutoff state (off state) where rotation is not rotated.

Additionally, it is preferable that the sub-motor is controlled to be zero torque by the inverter when transmitting the rotation of the main motor to the propeller via the slip clutch.

In this case, since the output command from the inverter to the sub-motor is set to torque zero at the time of the rotational driving of the main motor, the sub-motor idles, and degradation of the efficiency of the driving rotation caused by the main motor can be suppressed.

Additionally, it is preferable that rotation output of the sub-motor is also transmitted to the propeller when the rotation of the propeller is switched from the sub-motor to the main motor.

In a case where the propeller rotating speed reaches the predetermined rotating speed that is set in advance, the driving source is shifted from the sub-motor to the main motor. In that case, since the sub-motor is not stopped but the driving rotation thereof continues for a predetermined time, torque assist is performed and the driving source is gradually shifted to the main motor gradually. Therefore, smooth shifting can be performed without shock or the like being generated at the time of the shifting of the driving source. Therefore, the driving power of the propeller is not interrupted, and stable navigation with no delay of the propeller rotating speed is allowed.

The ship propulsion device according to the invention is a ship propulsion device that propels a ship by rotating a propeller. The ship propulsion device includes a sub-motor that transmits rotation to the propeller in a case where a rotating speed of the propeller is less than a predetermined rotating speed; an inverter that controls a rotating speed of the sub-motor; a main motor that transmits rotation to the propeller in a case where the rotating speed of the propeller is equal to or more than the predetermined rotating speed; a slip clutch that controls a rotating speed of the main motor to transmit the rotating speed to the propeller; and switching control member that switches a driving source for the rotation of the propeller from the sub-motor to the main motor in a case where the rotating speed of the propeller becomes equal to or more than the predetermined rotating speed.

According to the invention, in a case where the propeller output is less than the predetermined rotating speed, the small-capacity sub-motor is driven by inverter control to rotate the propeller, and if the predetermined rotating speed or more is reached, the driving source is switched from the sub-motor to the main motor by the switching control member, and a power transmission rate, such as the degree of slip, is controlled by the slip clutch for the rotational driving of the main motor so as to further increase the propeller rotating speed. Therefore, since shift from the sub-motor to the main motor can be made without the driving power of the propeller rotation being interrupted, control of stable propeller output and navigation can be performed.

Additionally, the ship propulsion device may further include an on-off clutch on a downstream side of the slip clutch.

By bringing the on-off clutch into the cutoff state when driving the sub-motor, rotation is not transmitted to the slip clutch or the like that is a drive system of the main motor installed on the upstream side of the on-off clutch. Therefore, the driving loss of the sub-motor is reduced, and the driving efficiency is improved.

In addition, the on-off clutch may be installed between the speed reducer and the slip clutch.

Additionally, the ship propulsion device of the invention may further include a speed reducer that reduces the rotation of the sub-motor and the rotation of the main motor to transmit the rotations to the propeller, and the slip clutch may be installed inside the speed reducer or outside the main motor.

By installing the slip clutch between the speed reducer and the main motor, the driving rotation of the main motor is controlled by the degree of slip of the slip clutch and is transmitted to the propeller via the speed reducer. Thus, the propeller rotation can be controlled by the slip clutch. Additionally, since the installation space of the slip clutch can be omitted in a case where the slip clutch is installed inside the speed reducer, space is saved.

In addition, the main motor may be an induction motor and the sub-motor may be a synchronous motor.

Advantageous Effects of Invention

According to the ship propulsion method and the ship propulsion device related to the invention, if the propeller rotating speed is less than the predetermined rotating speed, the rotation of the sub-motor is controlled by the inverter and is transmitted to the propeller so as to rotate the propeller, and if the predetermined rotating speed or more is reached, the driving source is switched from the sub-motor to the main motor, and the rotation of the main motor is controlled by the slip clutch so that the propeller can be rotated. Therefore, the rotation of the propeller can be controlled without using an internal combustion engine. Moreover, since the sub-motor of which the driving is controlled by the inverter has low output, an expensive made-to-order inverter is not used but a general-purpose article can be used. Thus, a panel for harmonic suppression for the stability of an inboard power source is unnecessary, cost is low, and space is saved.

Furthermore, by using the driving output of the small-capacity sub-motor in a stage in which the propeller output is less than the predetermined rotating speed and switching the driving output so as to use the driving output of the main motor by the slip clutch control in a stage in which the propeller output is equal to or more than the predetermined rotating speed, the loss of the propeller output can be reduced and efficient operation can be performed.

DESCRIPTION OF EMBODIMENTS

Hereinafter, a ship propulsion device according to an embodiment of the present invention will be described with reference to FIGS. 1 to 4.

Figure 1:
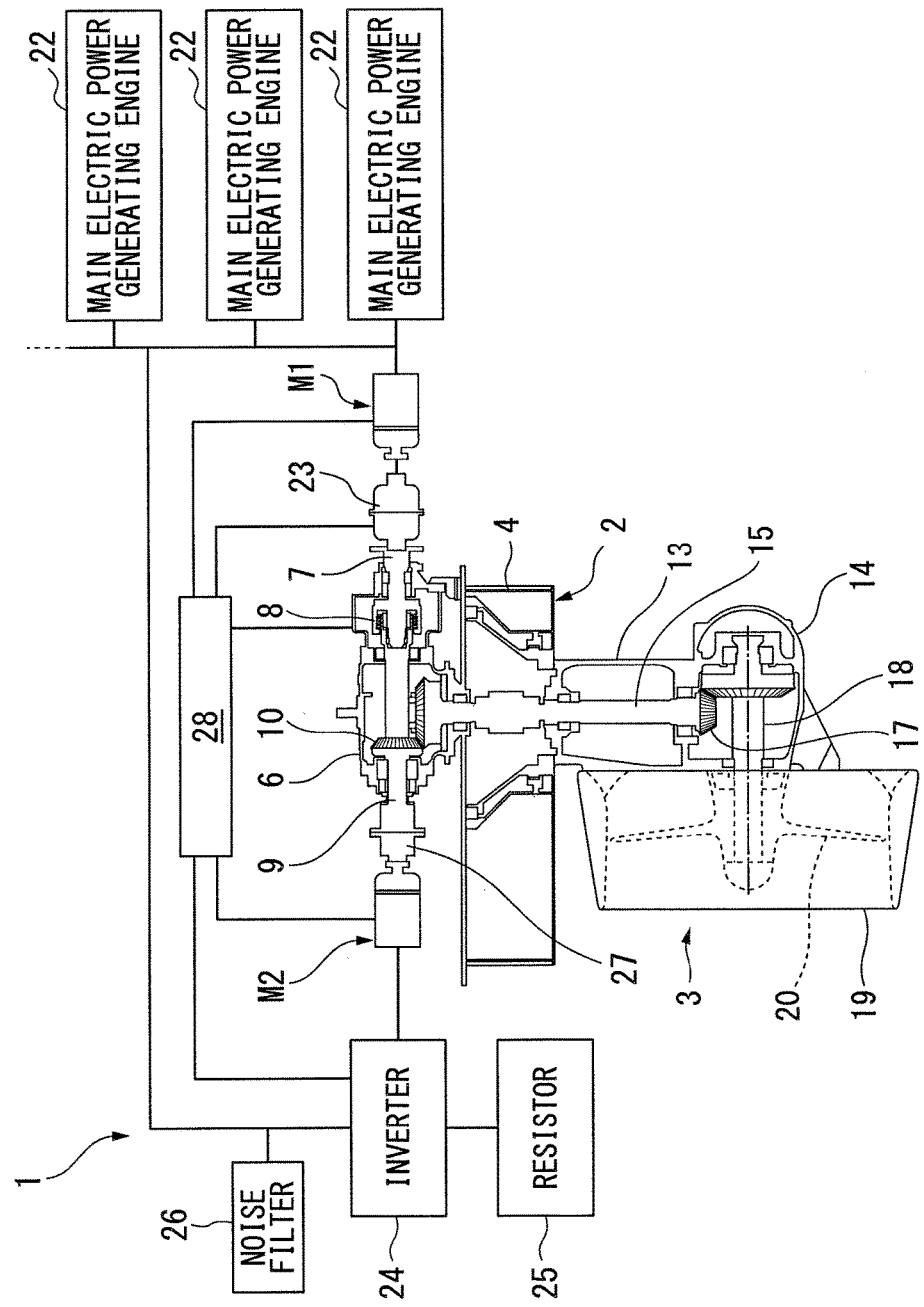
FIG. 1 is a view showing the configuration of main parts of a ship propulsion device according to the embodiment of the invention.
Figure 2:
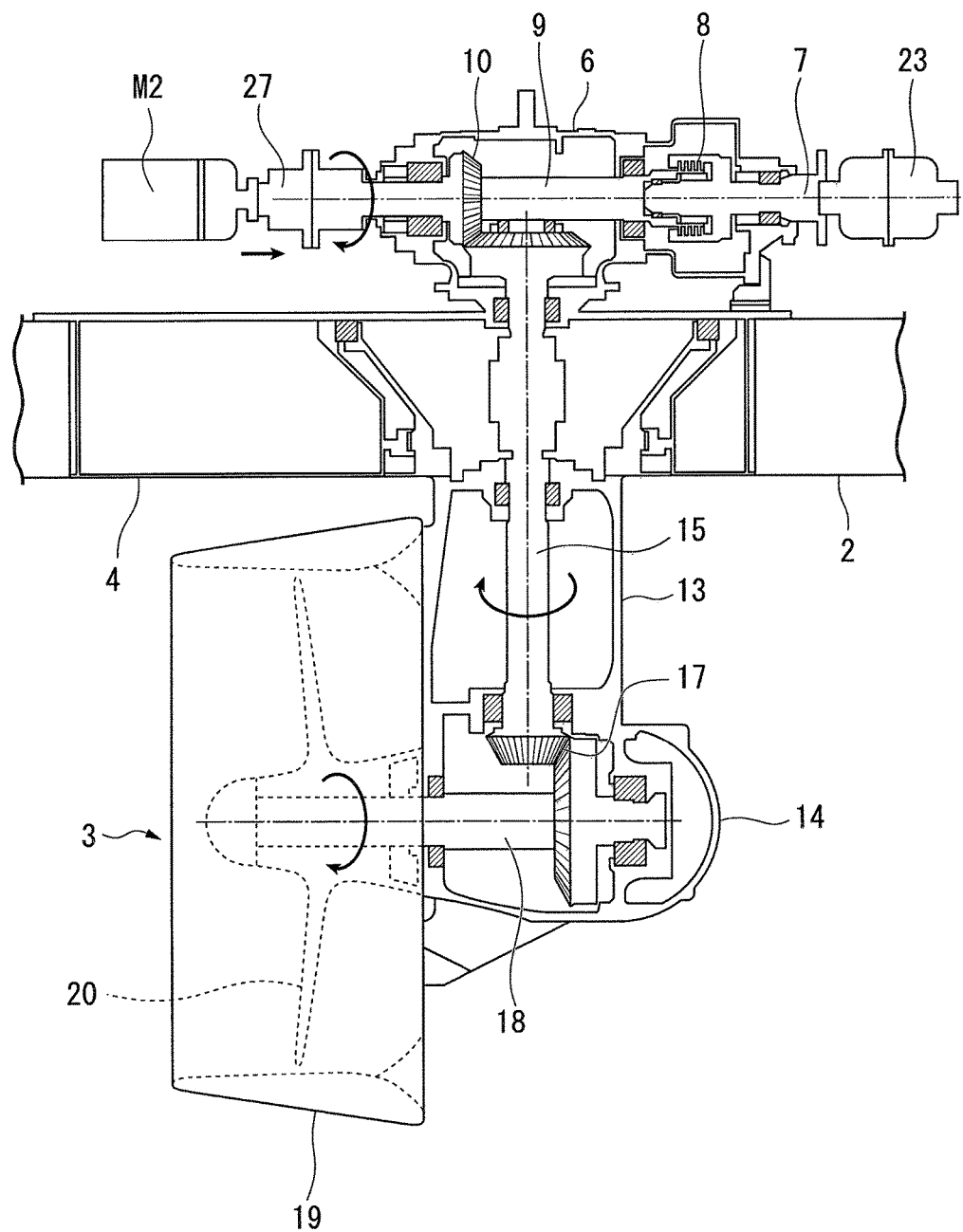
FIG. 2 is a partially enlarged view showing a drive system of a propeller of the ship propulsion device shown in FIG. 1.

A ship propulsion device 1 according to the present invention shown in FIGS. 1 and 2 is an azimuth thruster that turns a horizontal propeller shaft about a vertical shaft for transmitting power, and sets a propulsion direction. In the ship propulsion device 1 according to the embodiment shown in FIGS. 1 and 2, a base floor 4 serving as a base part of the azimuth thruster 3 of the ship propulsion device 1 is fixed to a bottom part of a stern of a ship 2 loaded with the ship propulsion device 1. A speed reducer 6 including a gear case is placed on an upper surface of the base floor 4, and a horizontal input shaft 7 that transmits drive power, an on-off clutch 8 that has the input shaft 7 coupled to drive power input side thereof, and a horizontal input/output shaft 9 that has one end coupled to an output side of the on-off clutch 8 are provided inside the speed reducer 6. An upper bevel gear 10 that transmits power in a direction orthogonal to a rotational direction of the input/output shaft 9 is provided as a first direction-changing mechanism within the speed reducer 6.

In the ship propulsion device 1 according to the present embodiment, a large-capacity main motor M1 with the same capacity as the propeller output of the ship 2 is coupled to one side via the input shaft 7 of the speed reducer 6, and a small-capacity sub-motor M2 is coupled to the other side via the input/output shaft 9. In the ship propulsion device 1 of the present embodiment, for example in the case of a work barge in which an operational state is divided into low output and high output, driving of the main motor M1 and the sub-motor M2 serving as driving sources is switched and controlled. An efficient switching operation can be performed by the sub-motor M2 driving a propeller 20 to be described below with low output, and the main motor M1 driving the propeller 20 with high output. Additionally, depending on propeller output or a method of operating the work barge, the capacity of the sub-motor M2, or the switching timing of the sub-motor M2 and the main motor M1 can be selected arbitrarily.

A hollow strut 13 and a casing 14 are integrally attached to a lower side of the base floor 4 so as to protrude downward from the ship 2 and become turnable. The strut 13 and the casing 14 can be turned by a turning driving mechanism that is not shown. A vertical shaft 15, which is provided within the strut 13 and the casing 14 and extend substantially vertically, has an upper end part coupled to the upper bevel gear 10 within the speed reducer 6, and a lower end part thereof pass through the base floor 4 and the bottom of the ship 2 and extends within the strut 13 and the casing 14 therebelow.

The lower end part of the vertical shaft 15 is coupled to one end side of the propeller shaft 18 that extends in a horizontal direction via a lower bevel gear 17 provided within the casing 14. The lower bevel gear 17 constitutes a second direction-changing mechanism. The other end side of the propeller shaft 18 extends into a substantially cylindrical duct 19 coupled to the casing 14, and a propeller 20 is attached to the other end of the propeller shaft 18 located within the duct 19. The propeller 20 is a fixed-pitch propeller.

Next, a drive mechanism of the ship propulsion device 1 of the ship 2 coupled to both ends of the speed reducer 6 will be described. In addition, in the present specification, a power transmission direction from the main motor M1 through the vertical shaft 15 to the propeller 20 is referred to as a downstream side in a drive system of the main motor M1, and its reverse direction is referred to as an upstream side. Additionally, similarly a power transmission direction from the sub-motor M2 through the vertical shaft 15 to the propeller 20 is referred to as a downstream side in a drive system of the sub-motor M2, and its reverse direction is referred to as an upstream side.

In the drive system of the main motor M1 provided in the ship propulsion device 1, the large-capacity main motor M1 is coupled to an upstream side of the on-off clutch (detachment clutch) 8 provided in the coupling part between the input/output shaft 9 and the input shaft 7 of the speed reducer 6 as a driving source. The main motor M1 is, for exampled, an induction motor or the like. The main motor M1 is electrically coupled to, for example, a main electric power generating engine 22, such as a diesel engine, and can supply electric power to the main motor M1. In the usual case, the main electric power generating engine 22 supplies electric power with a commercial frequency to the main motor M1, and the main motor M1 rotates at a given speed according to the frequency in a steady state.

A plurality of the main electric power generating engines 22 may be provided. The main electric power generating engine 22 requires such power capacity that the main motor M1 can be started, as an overall power generating machine. However, in the operation after the starting of the main motor M1, the required electric power capacity becomes smaller than the above electric power capacity, and in a case where only the sub-motor M2 is driven, the required electric power capacity becomes smaller. Since efficiency decreases in a case where a power generating engine with large electric power capacity is used for a small load, if the plurality of main electric power generating engines 22 are provided and a required number of power generating engines are used according to the necessity of power capacity, the efficiency improves. Additionally, in a case where the plurality of main electric power generating engines 22 are provided, main electric power generating engines with different kinds of electric power capacity may be combined together.

In the input shaft 7, a slip clutch 23 is coupled between the main motor M1 and the on-off clutch 8. The slip clutch 23 is constituted of a wet multi-plate type clutch in which a plurality of clutch plates are arranged in a stacked manner, and can transmit torque from one half part of the clutch to the other half part thereof by pressing frictional surfaces of the respective clutch plates against each other. Moreover, lubricating oil, such as oil, is always interposed between the frictional surfaces of the respective clutch plates.

The main motor M1 is driven at a given rotating speed, and propeller rotating speed is controlled by the slip clutch 23. By shifting among a directly-connected state, a high-speed rotation state with little slip, and a low-speed rotation state with large slip through a slip control in which a connected state of the slip clutch 23 is changed, the slip clutch 23 can be adjusted for acceleration or deceleration.

Additionally, in the drive system of the sub-motor M2 provided in the ship propulsion device 1, the small-capacity sub-motor M2 is coupled to an upstream side of the upper bevel gear 10 in the input/output shaft 9 of the speed reducer 6, as a driving source. The sub-motor M2 is, for example, a synchronous motor or the like. A general-purpose and small-sized inverter 24 is connected to the sub-motor M2 and is controlled by a controller 28. Speed control of the propeller can be performed by performing the torque control of the sub-motor M2 using the inverter 24 according to the rotating speed of the propeller that is an object to be controlled.

Here, since the small-capacity sub-motor M2 has capacity such that the sub-motor can cope with the general-purpose inverter 24, the sub-motor M2 can be set as an inexpensive system even if the sub-motor M2 is driven by the inverter. Specifically, although the small-capacity general-purpose inverter 24 can set applied motor output appropriately, the applied motor output is, for example, 1200 kW or less, preferably 560 kW or less, and more preferably 300 kW or less.

A resistor 25 is connected to the inverter 24, and if the propeller 20 is braked under the influence of waves during the driving of the sub-motor M2, electric power can be generated. In that case, however, power generation can be absorbed by the resistor 25. Additionally, instead of the resistor 25, a storage battery may be connected to the inverter 24 so as to store electricity. In this case, in a case where the propeller is driven by the sub-motor M2, it is possible to supply the electric power charged into the storage battery to the sub-motor M2.

The inverter 24 is electrically connected to the main electric power generating engine 22, and a noise filter 26 may be connected to this line. A coupling 27 may be connected between the sub-motor M2 and the input/output shaft 9. Otherwise, instead of the coupling 27, the on-off clutch (detachment clutch) may be installed in consideration of safety.

In the ship propulsion device 1 according to the present embodiment, the controller 28 that switches between the driving of the sub-motor M2 and the driving of the main motor M1 is installed. In a case where rotating speed of a propeller 20 is measured using a suitable measuring instrument, and the rotating speed of the propeller 20 is less than a predetermined rotating speed R that is set in advance, the small-capacity sub-motor M2 is driven, and in a case where the rotating speed of the propeller 20 is equal to or more than the predetermined rotating speed R, the driving source is switched from the sub-motor M2 to the main motor M1 and is driven.

In addition, as the value of the predetermined rotating speed R of the propeller 20, a suitable value can be selected in advance depending on the capacity of the sub-motor M2, the output of the propeller 20, a method of operating a work barge, or the like.

Figure 3:
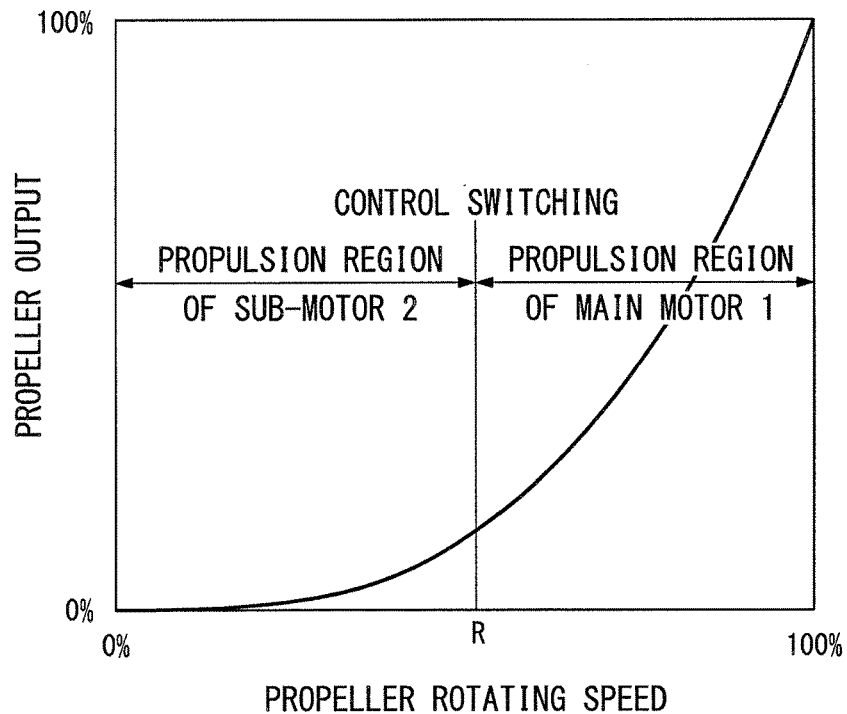
FIG. 3 is a graph showing a relationship between propeller rotating speed and propeller output according to respective propulsion regions of a sub-motor and a main motor.

FIG. 3 is a graph showing relationships between control switching points of the respective propulsion regions of the sub-motor M2 and the main motor M1 in the ship propulsion device 1, the propeller rotating speed, and the propeller output.

As shown in FIG. 3, in a low output propeller operation state from the beginning, the on-off clutch 8 is detached, the sub-motor M2 is driven, and the propeller output is raised. If the rotating speed of the propeller 20 reaches a control switching point of the predetermined value R, detection is made by the controller 28, and the driving source is controlled so as to be switched from the sub-motor M2 to the main motor M1.

In a switching shift period of the driving source, even if rotating speed exceeds R, the sub-motor M2 continues transmitting its rotation to the input/output shaft 9 without performing stop or cutoff, assists the main motor M1 in torque, and shifts the driving source to the main motor M1 gradually. The driving source just has to be switched from the sub-motor M2 to the main motor M1 until the propeller rotation increases within a range of a given rotating speed from a control switching point of the rotating speed R.

After the driving source has fully shifted to the main motor M1, the sub-motor M2 is rotated by the main motor M1 together with the propeller 20. However, since the torque of the sub-motor M2 is controlled and an output command from the inverter 24 to the sub-motor M2 makes torque 0 Nm, only idling occurs.

The control switching point and switching completion rotating speed of the driving source can be arbitrarily set by a navigation method or a ship operator's intention. Since switching is made between the main motor M1 and the sub-motor M2 by the slip clutch 23 while controlling the rotating speed, the driving power to the propeller 20 is not interrupted, and smooth and stable navigation without discomfort in which the propeller rotating speed is not delayed is enabled.

Figure 4:
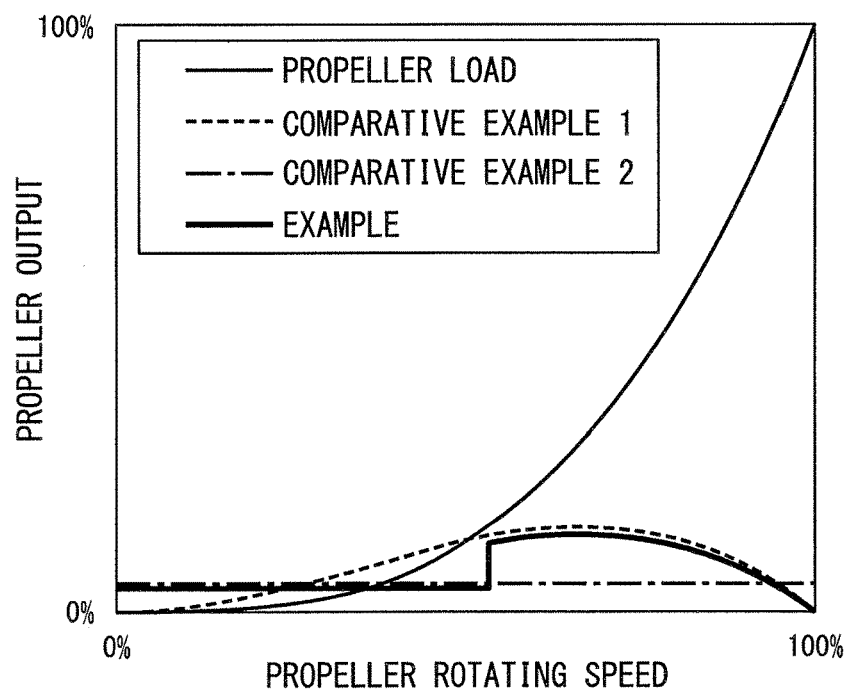
FIG. 4 is a graph showing relationships between propeller rotating speed and propeller output according to Example, Comparative Example 1 using the main motor, and Comparative Example 2 using the sub-motor.

Next, a calculation example of the magnitude of loss of the propeller output depending on the presence/absence of the slip clutch 23 is investigated through comparison with reference to FIG. 4. FIG. 4 shows the comparison between the loss of the inverter and the loss of a variable speed device of the slip clutch, without taking into consideration the loss of the motors or a power generator.

In FIG. 4, a case where the sub-motor M2 is driven at a low propeller output in the ship propulsion device 1 according to the embodiment and the driving source is switched to the main motor M1 at the predetermined rotating speed R or higher was adopted as an Example. Additionally, throughout the full range (0% to 100%) of the propeller rotating speed, a case where only the main motor M1 is driven was adopted as Comparative Example 1 (referred to as slip loss) and a case where only the sub-motor M2 with the inverter 24 is driven was adopted as Comparative Example 2 (referred to as inverter loss).

Changes in the loss of the propeller output when increasing the propeller rotating speed from 0% to 100% was tested using these Example and Comparative Examples 1 and 2.

Changes in the propeller output according to Example was represented as a propeller load for reference.

In Comparative Example 2, the loss of the propeller output changed in about 5%. In Comparative Example 1, the loss of the propeller output changed in a gently-sloping mounting shape, the loss of propeller output exceeds about 10% at the time of a low-speed rotation smaller than the predetermined rotating speed R, and the fuel consumption of the main electric power generating engine 22 that drives the main motor M1 deteriorates. Moreover, the inverter control has better response and better ship steerability than the slip clutch 23.

In contrast, in Example, the propeller output loss changes similar to Comparative Example 2 (inverter loss) until the propeller rotating speed reaches the predetermined rotating speed R at the time of control switching, and the propeller output loss is about 5%. Therefore, the propeller output loss is smaller than Comparative Example 1 (slip loss) and the efficiency becomes better by the same amount and the fuel consumption of the main electric power generating engine 22 becomes better.

Therefore, in a case where the propeller output increased, the driving source is switched from the sub-motor M2 to the main motor M1 if the propeller rotating speed reaches the control switching point shown in FIG. 3, and in a case where the propeller output is reduced, switching the driving source from the main motor M1 to the sub-motor M2 can be said to be efficient in the fuel consumption of the main electric power generating engine 22.

The ship propulsion device 1 according to the present invention includes the above-described configuration, and next, a ship propulsion method will be described with reference to FIGS. 1 to 4.

The sub-motor M2 is controlled by the inverter 24 according to an instruction from the controller 28 when starting the driving of the ship propulsion device 1 according to the present embodiment. In that case, however, the on-off clutch 8 is cut off, and drive power is not transmitted to the slip clutch 23 and the main motor M1. In this case, although the main motor M1 is a drive state, the main motor M1 may be in a stopped state.

Therefore, the driving loss of the main motor M1 is eliminated, which is efficient. The sub-motor M2 of which the driving is controlled by the inverter 24 transmits its low-output rotational driving power to the input/output shaft 9 and the speed reducer 6 via the coupling 27. Then, the power is transmitted from the upper bevel gear 10 within the speed reducer 6 via the vertical shaft 15 and the lower bevel gear 17 to the propeller shaft 18, and rotationally drives the propeller 20.

Then, if the propeller rotating speed becomes equal to or more than R that is the control switching value, in the controller 28, the on-off clutch 8 is coupled, and the driving source is switched from the sub-motor M2 to the main motor M1 and is rotationally driven. Then, the rotational driving power of the main motor M1 is transmitted to the input shaft 7, the on-off clutch 8, the input/output shaft 9, and the speed reducer 6 via the slip clutch 23, and the power is further transmitted from the upper bevel gear 10 to the vertical shaft 15, and rotationally drives the propeller 20 with high output.

In the main motor M1 that rotates at a constant speed, a low-speed rotation state with large slip is changed to a high-speed rotation state that has little slip or becomes a clutch directly-connected state through the slip control of the slip clutch 23. In a case where the slip rotating speed is reduced, slip control can be performed in a reverse direction so as to make a deceleration adjustment.

Switching is not immediately completed at the time of shifting the driving source, the sub-motor M2 is also rotatively driven transitionally together with the main motor M1 so as to perform torque assist, and the driving source is gradually shifted to the main motor M1 while raising the rotating speed. Then, the driving source is fully shifted to the main motor M1 until the propeller rotating speed rises from the control switching point by a given rotating speed. If the driving source is fully shifted to the main motor M1, the sub-motor M2 is rotated by the main motor M1 together with the propeller 20. However, since the torque of the sub-motor M2 is controlled, and an output command from the inverter 24 is makes torque 0 Nm, idling occurs.

In addition, in a case where the rotation of a propeller 20 is deceleration driving, drive control just has to be performed contrary to the above-described case.

According to the ship propulsion device 1 and ship propulsion method according to the present embodiment as described above, if the rotating speed of the propeller 20 is less than the predetermined rotating speed R, the rotation of the sub-motor M2 is controlled by the inverter 24 so as to rotate the propeller 20, and if the rotating speed of the propeller is equal to or more than the predetermined rotating speed R, the rotation of the main motor M1 is controlled by the slip clutch 23 so as to rotate the propeller 20. Therefore, the rotation of the propeller 20 can be controlled without using an internal combustion engine.

Moreover, since the sub-motor M2 controlled by the inverter 24 has low output and small capacity, an expensive made-to-order inverter is not used but a general-purpose article is satisfactory, and since a panel for harmonic suppression for the stability of an inboard power source is unnecessary, cost is low, and space is saved.

Additionally, the two types of motors are used, and combination is made by performing the driving of the sub-motor M2 by the inverter control in a case where the propeller 20 has low output and by driving the main motor M1 by the slip clutch control in which the inverter 24 is not used in a case where the propeller 20 has high output. Therefore, the driving power of the propeller 20 is not interrupted, shifting can be smoothly and continuously performed, and stable navigation can be performed. Moreover, an efficient operation can be performed by reducing the loss of the propeller output, and the fuel consumption of the main electric power generating engine 22 that drives the two motors can be reduced.

Additionally, in a stage where the sub-motor M2 is driven with the propeller rotation being low-speed rotation, the transmission of power from the main motor M1 is cut off by the on-off clutch 8 within the speed reducer 6. Therefore, there is no need to transmit the rotation to the input shaft 7 and the slip clutch 23 on the upstream side, the driving loss decreases, and the driving efficiency improves.

Also, the torque is controlled by the inverter 24 at the time of the driving of the sub-motor M2 so as to drive the propeller 20. However, since the propeller 20 is braked under the influence of waves or the like, in a case where electric power is generated by the sub-motor M2, the electric power can be absorbed by the resistor 25. Additionally, if a storage battery is connected instead of the resistor 25, it is possible to perform reuse, such as charging electric power to supply the electric power to the sub-motor M2.

In addition, the invention is not limited to the ship propulsion device 1 and the ship propulsion method according to the above-described embodiment, various changes or substitutions can be made without departing from the concept of the invention, and these are included in the invention.

Next, although the modification examples of the embodiment of the present invention have been described, the modification example will be described with the same reference signs being given to the same portions or members as those of the above-described embodiment.

Figure 5:
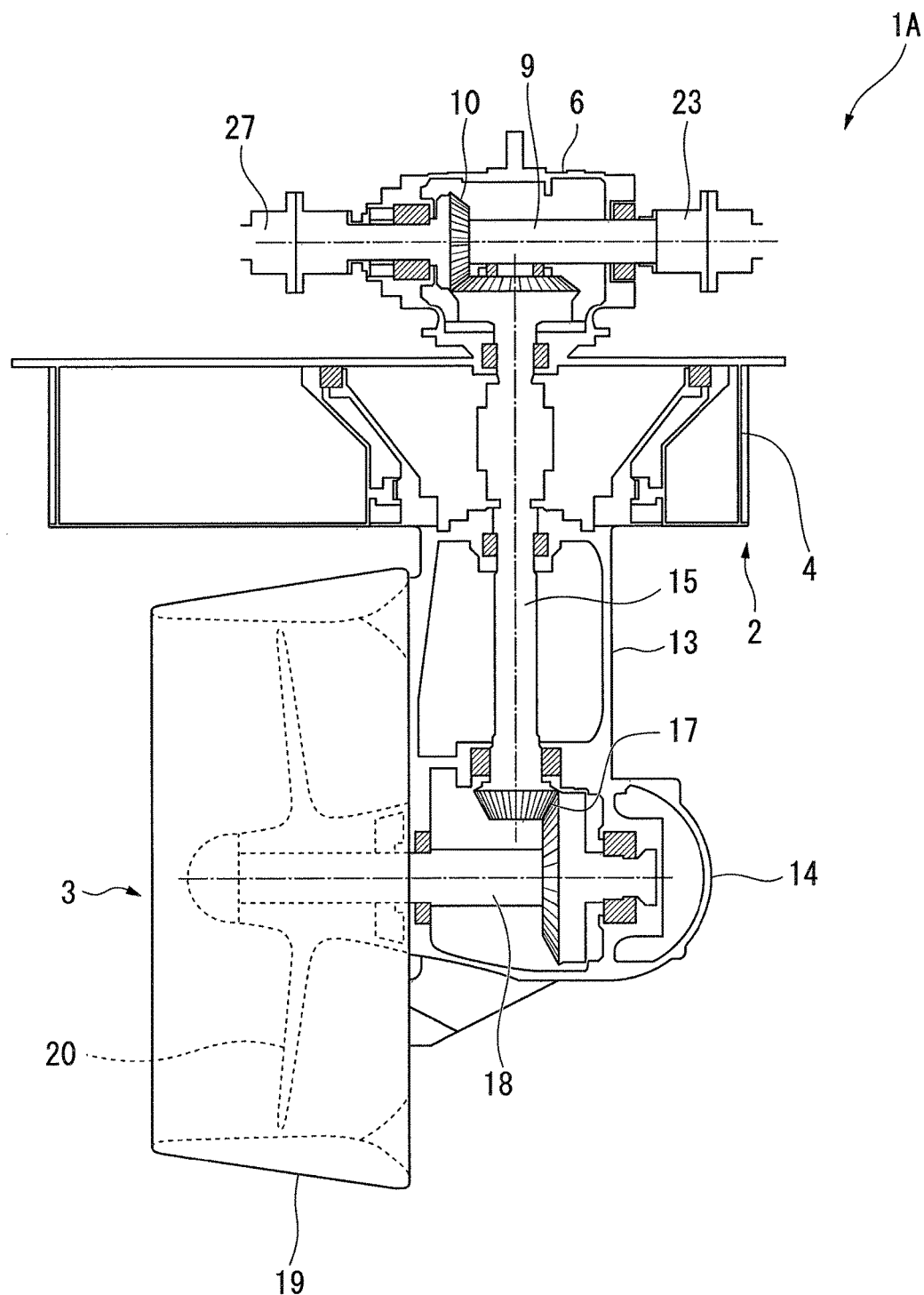
FIG. 5 is a sectional view of main parts showing a coupling configuration between a speed reducer and a slip clutch according to a first modification example of the present embodiment.

FIG. 5 shows a ship propulsion device 1A according to a first modification example of the embodiment of the present invention. In the present first modification example, the on-off clutch 8 within the speed reducer 6 on the downstream side of the main motor M1 is omitted. In the present first modification example, the slip clutch 23 provided on the upstream side of the speed reducer 6 is also made to function as the on-off clutch 8.

Therefore, the transmission of driving to the main motor M1 can be prevented by cutting off the slip clutch 23 when driving the rotation of the sub-motor M2 at the time of the low-speed rotation of the propeller 20.

Figure 6:
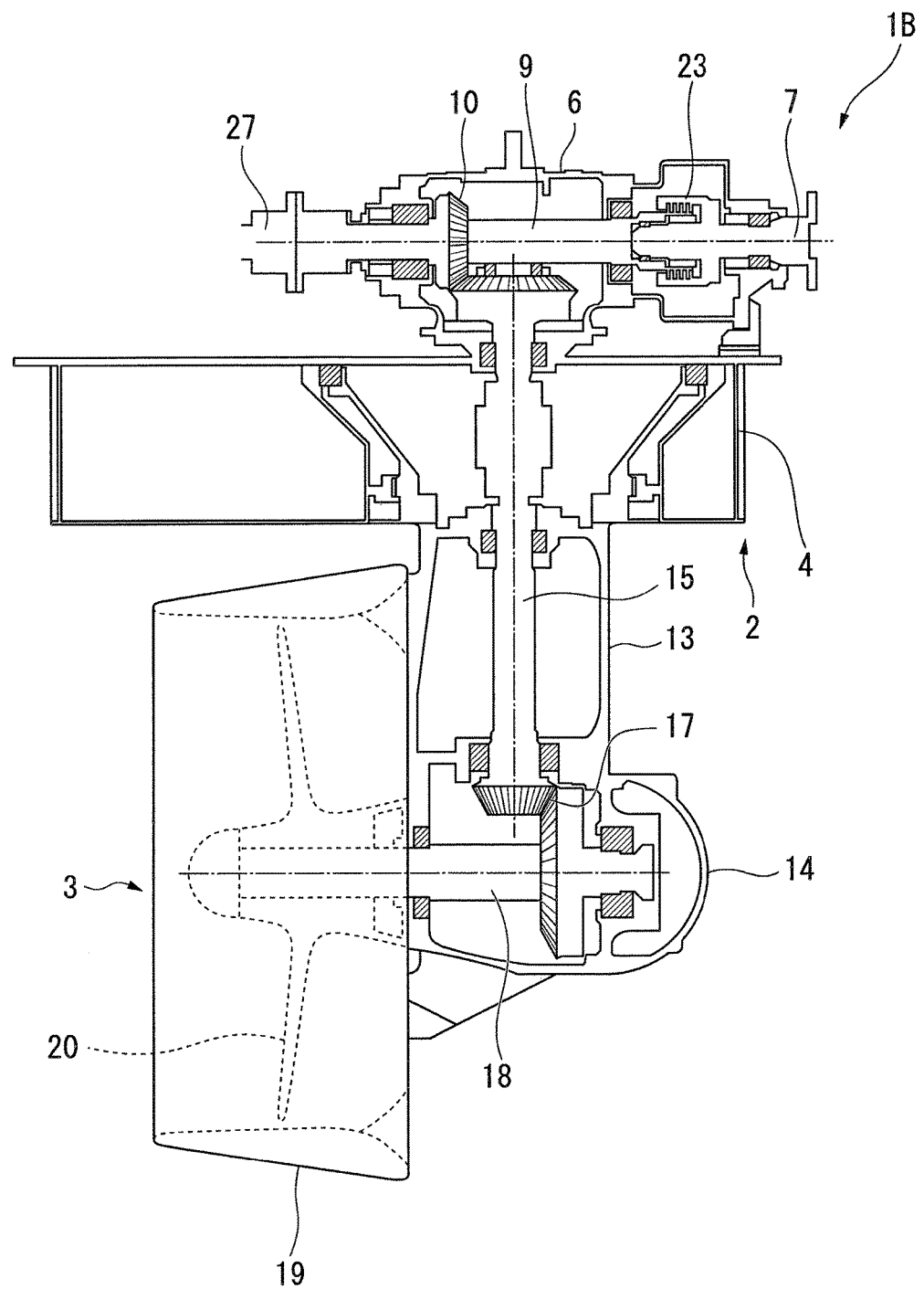
FIG. 6 is a sectional view of main parts showing a coupling configuration between a speed reducer and a slip clutch according to a second modification example of the present embodiment.

Next, FIG. 6 shows a ship propulsion device 1B according to a second modification example. Also in the present second modification example, the on-off clutch 8 within the speed reducer 6 on the downstream side of the main motor M1 is omitted. Also, the slip clutch 23 is provided within the speed reducer 6 and is made to function as the on-off clutch 8.

Therefore, in present the second modification example, similar to the first modification example, the transmission of driving to the main motor M1 can be prevented by cutting off the slip clutch 23 when driving the sub-motor M2 at the time of the low-speed rotation of the propeller 20. Moreover, since the slip clutch 23 is installed within the speed reducer 6, it is not necessary to provide an installation space for the slip clutch 23 outside the speed reducer 6, and space is further saved.

In addition, in the above-described embodiment, in the main motor drive system, the slip clutch 23 is provided on the downstream side of the main motor M1. However, for example, a friction clutch, a hydraulic clutch, a torque converter clutch, or the like can be adopted as the slip clutch 23.

Additionally, in the drive system of the sub-motor M2, the coupling 27 or the on-off clutch that is provided between the sub-motor M2 and the input/output shaft 9 may be omitted, and the sub-motor and the input/output shaft may be directly coupled together.

INDUSTRIAL APPLICABILITY

The invention provides a ship propulsion device and a ship propulsion method that requires small occupation space and cost low, though an inverter is used, and are adapted to be able to achieve efficient drive control and fuel consumption according to propeller output.

REFERENCE SIGNS LIST 1, 1A, 1B: SHIP PROPULSION DEVICE
2: SHIP
6: SPEED REDUCER
7: INPUT SHAFT
8: ON-OFF CLUTCH
9: INPUT/OUTPUT SHAFT
20: PROPELLER
23: SLIP CLUTCH
24: INVERTER
28: CONTROLLER
M1: MAIN MOTOR
M2: SUB-MOTOR

The invention claimed is:

1. A ship propulsion method for rotating a propeller to propel a ship, the ship propulsion method comprising:
controlling a rotating speed of a sub-motor using an inverter to transmit the rotating speed to the propeller when a rotating speed of the propeller is less than a predetermined rotating speed;
providing an electric power generating engine that generates electric power with a commercial frequency and supplies the generated power with the commercial frequency;
supplying the electric power with the commercial frequency directly from the electric power generating engine to a main motor to rotate the main motor and drive the main motor, the main motor being an induction motor; and
controlling a rotating speed of the propeller between a high rotating speed and a low rotating speed using a slip clutch to transmit torque from the main motor to the propeller when the rotating speed is equal to or more than the predetermined rotating speed.

2. The ship propulsion method according to claim 1, wherein the slip clutch is held in a cutoff state when the rotation of the sub-motor is controlled by the inverter and is transmitted to the propeller.

3. The ship propulsion method according to claim 2, wherein the sub-motor is controlled to be zero torque by the inverter when transmitting the rotation of the main motor to the propeller via the slip clutch.

4. The ship propulsion method according to claim 3, wherein rotation output of the sub-motor is also transmitted to the propeller when the rotation of the propeller is switched from the sub-motor to the main motor.

5. The ship propulsion method according to claim 2, wherein rotation output of the sub-motor is also transmitted to the propeller when the rotation of the propeller is switched from the sub-motor to the main motor.

6. The ship propulsion method according to claim 1, wherein an on-off clutch provided on a downstream side of the slip clutch with respect to the main motor is brought into a cutoff state when the rotation of the sub-motor is controlled by the inverter and is transmitted to the propeller.

7. The ship propulsion method according to claim 6, wherein the sub-motor is controlled to be zero torque by the inverter when transmitting the rotation of the main motor to the propeller via the slip clutch.

8. The ship propulsion method according to claim 7, wherein rotation output of the sub-motor is also transmitted to the propeller when the rotation of the propeller is switched from the sub-motor to the main motor.

9. The ship propulsion method according to claim 6, wherein rotation output of the sub-motor is also transmitted to the propeller when the rotation of the propeller is switched from the sub-motor to the main motor.

10. The ship propulsion method according to claim 1, wherein the sub-motor is controlled to be zero torque by the inverter when transmitting the rotation of the main motor to the propeller via the slip clutch.

11. The ship propulsion method according to claim 10, wherein rotation output of the sub-motor is also transmitted to the propeller when the rotation of the propeller is switched from the sub-motor to the main motor.

12. The ship propulsion method according to claim 1, wherein rotation output of the sub-motor is also transmitted to the propeller when the rotation of the propeller is switched from the sub-motor to the main motor.

13. The ship propulsion method according to claim 1, wherein the sub-motor is a synchronous motor.

14. A ship propulsion device that propels a ship by rotating a propeller, the ship propulsion device comprising:
- a sub-motor that transmits rotation to the propeller when a rotating speed of the propeller is less than a predetermined rotating speed;
- an inverter that controls a rotating speed of the sub-motor;
- an electric power generating engine that generates electric power with a commercial frequency and supplies the generated electric power with the commercial frequency directly to a main motor;
- the main motor being rotated by the electric power from the electric power generating engine and transmitting rotation to the propeller when the rotating speed of the propeller is equal to or more than the predetermined rotating speed;
- a slip clutch that controls a rotating speed of the propeller between a high rotating speed and a low rotating speed in transmitting the rotating speed to the propeller from the main motor; and
- a switching control member that switches a driving source for the propeller from the sub-motor to the main motor when the rotating speed of the propeller becomes equal to or more than the predetermined rotating speed, wherein the main motor is an induction motor.

15. The ship propulsion device according to claim 14, further comprising:
- an on-off clutch on a downstream side of the main motor.

16. The ship propulsion device according to claim 15, further comprising:
- a speed reducer that reduces the rotation of the sub-motor and the rotation of the main motor to transmit the rotations to the propeller, and the slip clutch is installed inside the speed reducer or outside the main motor.

17. The ship propulsion device according to claim 16, wherein the sub-motor is a synchronous motor.

18. The ship propulsion device according to claim 15, wherein the sub-motor is a synchronous motor.

19. The ship propulsion device according to claim 14, further comprising:
- a speed reducer that reduces the rotation of the sub-motor and the rotation of the main motor to transmit the rotations to the propeller, and the slip clutch is installed inside the speed reducer or outside the main motor.

20. The ship propulsion device according to claim 19, wherein the sub-motor is a synchronous motor.

21. A ship propulsion device that propels a ship by rotating a propeller, the ship propulsion device comprising:
- a sub-motor that transmits rotation to the propeller when a rotating speed of the propeller is less than a predetermined rotating speed;
- an inverter that controls a rotating speed of the sub-motor;
- a main motor that transmits rotation to the propeller when the rotating speed of the propeller is equal to or more than the predetermined rotating speed;
- a slip clutch that controls a rotating speed of the main motor to transmit the rotating speed to the propeller; and
- a switching control member that switches a driving source for the propeller from the sub-motor to the main motor when the rotating speed of the propeller becomes equal to or more than the predetermined rotating speed;
- wherein the main motor is an induction motor, and the sub-motor is a synchronous motor.

* * * * *